April 14, 1959 R. FAVRE 2,882,397

CIRCUIT FOR TRANSFORMING A STORED ELECTRIC QUANTITY INTO A NUMBER PROPORTIONAL TO THIS ELECTRIC QUANTITY OF ELECTRIC PULSES

Filed March 23, 1954

INVENTOR
ROBERT FAVRE
BY Edward T Connors
ATTORNEY

United States Patent Office 2,882,397

Patented Apr. 14, 1959

2,882,397

CIRCUIT FOR TRANSFORMING A STORED ELECTRIC QUANTITY INTO A NUMBER PROPORTIONAL TO THIS ELECTRIC QUANTITY OF ELECTRIC PULSES

Robert Favre, Lausanne, Switzerland, assignor to Ebauche S.A., Neuchatel, Switzerland Application March 23, 1954, Serial No. 418,200

Claims priority, application Switzerland April 1, 1953

5 Claims. (Cl. 250—27)

Figure 1:
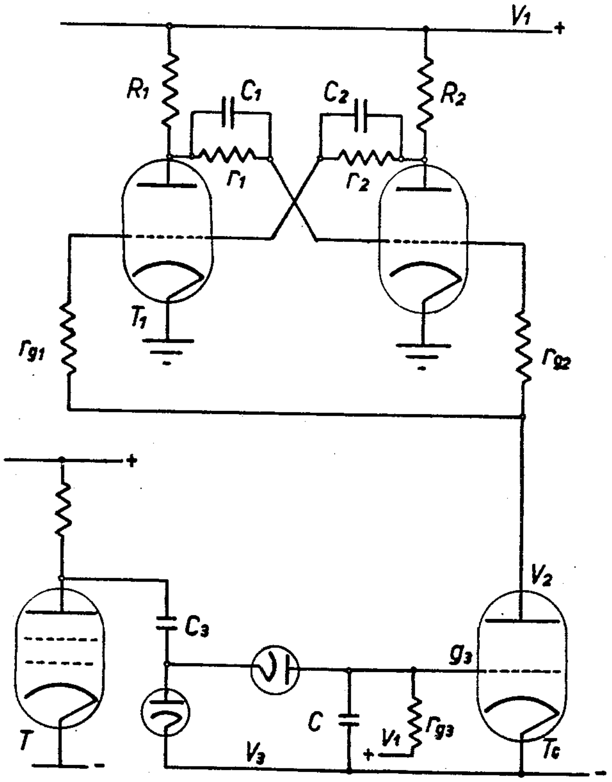

This invention relates to a method for transforming a stored electric quantity into a number proportional to this electric quantity of electric pulses. It is broadly characterized in that the electric quantity is discharged at least approximately linearly and in that a circuit capable of oscillation, for instance a multivibrator, is controlled by the said electric quantity to become unstable for such a time that it is producing a number of electric pulses proportional to the stored electric quantity.

The said electric quantity may preferably be constituted by a number of unitary charges stored in a condenser, whereby the said circuit capable of oscillations is controlled to become unstable by the decaying condenser voltage.

This method has special advantages in connection with the well known method (described in the "Journal of Scientific Instruments," April 1952, pages 111–115 or in "Onde Electrique" of June 1949, pages 241–254) for counting pulses, wherein a given number of pulses, for instance ten pulses are stored in a condenser and suddenly discharged from the condenser thereby counting every tenth pulse. In order to count the residual unitary charges in the condenser at the end of the counting period the condenser is discharged and a circuit capable of oscillation is controlled by the decaying condenser voltage to become unstable for a time during which it is producing a number of pulses equal to the number of residual unitary charges stored in the said condenser.

This invention may preferably be used in a method and circuits for improving the resolving power of an electronic counter or frequency divider for incoming electric pulses applied to an input stage capable of oscillation of the said electronic counter or frequency divider.

The resolving power of an electronic counter in which the electric pulses to be counted are applied to the input stage of a frequency divider is limited by the speed of response of this input stage. When successive pulses are following each other within the time of response of the input stage of the frequency divider or counter, the input stage will operate as though the first pulse only had been applied to it so that the second pulse would not be counted.

It is an object of this invention to avoid such a loss of pulses without improving the speed of response or rapidity of action of the input stage of the electronic counter or frequency divider per se. In accordance with this invention this is possible when any pulse applied to the said input stage is extended by another pulse applied before or during the response of the said input stage in such a way that the input stage is transmitting under multivibrator operation a number of pulses equal to the number of pulses applied to the input stage.

In this way pulses coming in at random are counted without any loss provided that the mean frequency of the pulses is equal to or below the frequency of the input stage under multivibrator operation.

Figure 2:
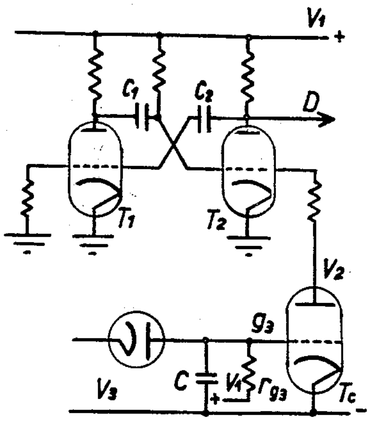

Two circuits illustrating the invention are shown by way of example in the attached drawing of which:

Fig. 1 shows a circuit having a binary input stage which makes part of the frequency divider itself; and Fig. 2 shows a circuit having an input stage of the "flip-flop" type connected in cascade with a frequency divider (not shown).

Having reference to Fig. 1 of the drawing the operation of the binary stage of the frequency divider will be described. The binary stage has two electronic tubes T1 and T2 of which one is conducting and the other is non-conducting. This way of operation is obtained by polarising the control grids of these tubes by means of the voltage dividers *r*1, *rg*2 and *r*2, *rg*1 respectively connected to the plate of the other tube and to the plate V2 of another electronic tube T*c*, the cathode of which is connected to the negative potential line V3. The plates of the tubes T1 and T2 are connected to a positive potential line V1 by means of load resistors R1 and R2 respectively. The above mentioned voltage dividers are so designed that the control grid of any tube is negative below cut-off when the other tube is conducting and that the control grid of any tube is slightly above cathode potential due to the grid current when the other tube is non-conducting.

Coupling condensers C1 and C2 are provided for transmission of voltage surges from the plate of one tube to the grid of the other. From the above it is seen that the binary stage is capable of two different steady conditions in which one tube is conducting and the other is non-conducting or vice versa.

When a positive pulse of suitable voltage appears on the plate V2 of tube T*c* the condition of the binary stage is changed over, that is the non-conducting tube becomes conducting and the conducting tube becomes non-conducting due to the negative surge applied to its control grid from the plate of the hitherto non-conducting tube.

When, however, the duration of the positive pulse on the plate V2 of tube T*c* lasts for some time the control grid of the tube which was changed over from the conducting to the non-conducting condition according to the above description will again rise over cut-off potential. The tube becomes conducting, thereby effecting another changing over of the condition of the binary circuit and so on. The binary circuit will now operate under multivibrator conditions as long as the said positive potential is applied to the plate V2 of tube T*c*.

The control grid *g*3 of tube T*c* is connected to the plate of a preamplifier tube T through rectifier *d*1 and coupling condenser C3. The potential of the control grid of tube T*c* is normally held above cathode potential of the tube T*c* by means of the high ohmic resistor *rg*3 and the rectifiers or diodes *d*1 and *d*2. A condenser C is connected between the control grid and the cathode of tube T*c*.

Incoming pulses which are to be counted are applied to the control grid of tube T which is normally held below cut-off. On the application of a positive pulse to the control grid of tube T this tube becomes conducting and the negative voltage surge appearing on its plate is transmitted to condenser C and to the grid *g*3 of tube T*c* through condenser C3 and the rectifier or diode *d*1. Thereby the condenser C is discharged and will slowly be recharged from the positive potential line V1 through resistor *rg*3. The positive surge appearing on the plate of tube T at the end of the incoming pulse will be discharged through diode *d*2 without taking influence on the grid *g*3 of tube T*c* and on the pulse storing condenser C.

Thus any incoming pulse will cause the transmission of a negative surge to the control grid g3 of tube T*c* thereby increasing the voltage drop in this tube so that the potential on the plate V2 of this tube is increasing. Thereby the binary circuit of tubes T1 and T2 becomes unstable and changes its condition. The coupling condenser C3, the resistance of diode $d1$, the storing condenser C and the charging resistor $rg3$ are so designed that on application of one pulse to the control grid of the preamplifier tube T the negative surge transmitted to the condenser C and to grid $g3$ will be of such duration and voltage that the binary circuit will change its condition once.

When, however, another pulse is applied to the control grid of tube T before the binary circuit has returned to its stable condition, another negative charge of practically the same quantity as for the first pulse will be applied to the storing condenser C thereby extending the negative pulse applied to the grid $g3$ of tube $Tc$ for such a period that the binary circuit still under unstable or multivibrator condition will again change over into its original condition.

When three pulses are applied to the control grid of tube T within the period of response of the binary stage, three approximatively similar charges will be applied to the condenser C. Due to the high voltage of the line V1 discharging of the storing condenser C will be approximatively linear so that the time for which the negative pulse is applied to the grid $g3$ of tube $Tc$ and for which the binary circuit will operate under unstable or multivibrator condition will be proportional to the number of pulses applied to the control grid of tube T. In this way it is possible to control the period of unstability of the binary circuit in such a way that the number of pulses transmitted by the binary circuit during its operation under multivibrator conditions is equal to the number of pulses stored in the storing condenser C. Thereby a series of pulses coming in at random at a mean frequency below the multivibrator frequency of the binary stage may be transformed into a series of pulses at a maximum frequency equal to the multivibrator frequency.

The circuit of Fig. 2 is similar in construction and operation as the circuit of Fig. 1 except for the binary stage which is a "flip-flop" stage. The preamplifier T, the coupling condenser C3 and the diode $d2$ are not shown in Fig. 2. The "flip-flop" circuit differs from the binary stage of Fig. 1 in that there is one stable condition only whereby the grid of tube T1 is at cathode potential and tube T1 is conducting and whereby the grid of tube T2 is below cut-off. On application of a positive pulse to the plate V2 of tube $Tc$ tube T2 becomes conducting and the grid of tube T1 is brought below cut-off by the negative surge transmitted to it over coupling condenser C2. Later on the grid potential in tube T1 will again approach the cathode potential and tube T1 becomes conducting thereby conversing tube T2 into non-conducting condition.

When, however, a lasting rise of potential is effected on the anode of tube $Tc$ the "flip-flop" stage will continuously become unstable and will oscillate under multivibrator conditions as long as the potential rise on the plate V2 of tube $Tc$ persists.

In this way one changing over of the "flip-flop" stage will occur for any single incoming pulse and one pulse will be transmitted to the line D connected to the input of a counter or frequency divider. When several pulses are coming in during the period of response of the "flip-flop" stage, such pulses are stored in the storing condenser C whereby the application of a negative potential to the grid $g3$ of tube $Tc$ will be extended for the time required for the "flip-flop" stage to transmit under multivibrator conditions a number of pulses over the line D equal to the number of pulses stored in the condenser C.

The circuit shown in Fig. 2 is particularly designed for use with an existing counter of which the resolving power would not be sufficient for the detection of shortly spaced pulses coming in at random.

The charging resistor $rg3$ of the storing condenser C might be connected to the cathode of tube $Tc$ instead of being connected to the positive potential line V1, in which case the linearity of discharging of the condenser C would be impaired.

What I claim is:

1. An electronic circuit for counting electric pulses coming in at random including means for adding a unitary charge to a storing condenser for every incoming pulse, a resistor connected to the said storing condenser for steady and at least approximately linear discharge of the same, a "flip-flop" stage including two electronic tubes having control grids, a polarizing tube having a plate and a control grid, the control grid of one tube of the said "flip-flop" stage being connected to the said plate of the polarizing tube, the control grid of the polarizing tube being connected to the said storing condenser and the cathode potential of the said polarizing tube being lower than the cathode potential of the tubes of the "flip-flop" stage.

2. An electronic circuit for transforming a stored electric quantity into a number proportional to this electric quantity of electric pulses, including a capacity for storing the said electric quantity, a discharging resistor connected to the said storing capacity for steady and at least approximately linear discharge of the same and a binary-stage oscillating circuit comprising electronic tubes, the electronic tubes of the binary-stage having grid polarizing resistors connected to the anode of a polarizing electronic tube, the said storing capacity being connected to the control grid of the said polarizing electronic tube, the polarizing tube constituting an uncoupling means between the said capacity and the said oscillating circuit, and the cathode potential of the said polarizing electronic tube being lower than the cathode potential of the electronic tubes of the said binary stage.

3. An electronic circuit as specified in claim 2, comprising an input tube having a control grid normally held at a potential below cut-off, means for applying positive incoming pulses to the control grid of said input tube for rendering it conducting, rectifier means being connected between the anode of the said input tube and the said storing capacity.

4. An electronic circuit for transforming a stored electric quantity into a number proportional to this electric quantity of electric pulses, comprising a capacity for storing the said electric quantity, a voltage on the said condenser proportional to the electric quantity stored therein, a discharging resistor connected to the said storing capacity for steady and at least approximately linear discharge of the capacity, an oscillating circuit having control means, a direct current connection between the said capacity and the said control means of the said oscillating circuit, a threshold voltage for the said control means for which the said oscillating circuit is capable of self-sustained oscillation, a number of pulses being produced by the self-sustained oscillation of the said oscillating circuit, this number of pulses being proportional to the length of time during which the said voltage on the condenser exceeds the said threshold voltage.

5. An electronic circuit for transforming a stored electric quantity into a number proportional to this electric quantity of electric pulses, comprising a capacity for storing the said electric quantity, a voltage on the said condenser proportional to the electric quantity stored therein, a discharging resistor connected to the said storing capacity for steady and at least approximately linear discharge of the capacity, an oscillating circuit having control means, a connection between the said capacity and the said control means of the said oscillating circuit, a threshold voltage for the said control means for which the said oscillating circuit is capable of self-sustained oscillation, a number of pulses being produced by the self-sustained oscillation of the said oscillating circuit, this number of pulses being proportional to the length of time during which the said voltage on the condenser exceeds the said threshold voltage.

(References on following page)

References Cited in the file of this patent

UNITED STATES PATENTS

| | | |
|---|---|---|
| 2,487,191 | Smith | Nov. 8, 1949 |
| 2,489,269 | Cleeton | Nov. 29, 1949 |
| 2,489,824 | Shenk | Nov. 29, 1949 |
| 2,500,581 | Seeley | Mar. 14, 1950 |
| 2,518,499 | Smith | Aug. 15, 1950 |
| 2,579,217 | Tyzzer | Dec. 18, 1951 |
| 2,619,618 | Adler | Nov. 25, 1952 |
| 2,653,236 | Phelan | Sept. 22, 1953 |
| 2,701,303 | Wells | Feb. 1, 1955 |